(No Model.)
N. P. MARSH.
HAY RACK.
No. 275,239. Patented Apr. 3, 1883.
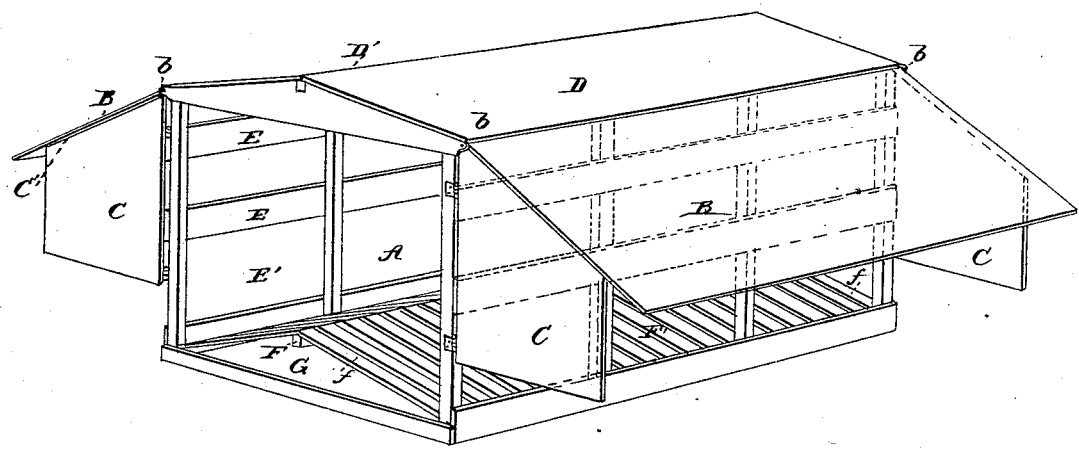
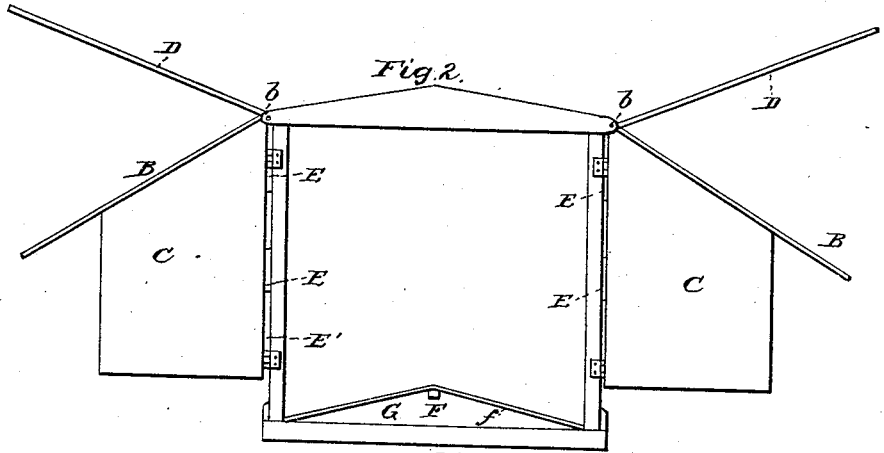
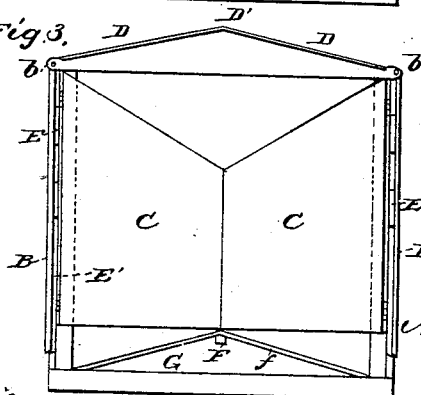
WITNESSES:
Fred. G. Dieterich.
John G. Hinkel
Napoleon P. Marsh,
INVENTOR.
by Louis Bagger & Co,
ATTORNEYS.

UNITED STATES PATENT OFFICE.

NAPOLEON P. MARSH, OF JOSEPH'S MILLS, WEST VIRGINIA.

HAY-RACK.

SPECIFICATION forming part of Letters Patent No. 275,239, dated April 3, 1883.

Application filed October 6, 1882. (No model.)

*To all whom it may concern:*

Be it known that I, NAPOLEON P. MARSH, of Joseph's Mills, in the county of Tyler and State of West Virginia, have invented certain new and useful Improvements in Hay-Racks; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved device for feeding stock. Fig. 2 is an end view of the same when open, and Fig. 3 when closed.

Similar letters of reference indicate corresponding parts in all the figures.

My invention has relation to that class of hay-racks having a false slat-bottom to allow the hay-seed and short particles of feed to fall through, and provided with doors and hinged flaps, which form a shelter for the cattle while feeding; and it consists in the improved construction and combination of parts of the same, as hereinafter more fully described and claimed.

The sides B of the box A are hinged at *b b*, so that they can be lifted up and form a shed or protection against sun, wind, or rain for the stock. To support the sides B, when serving as a shed, the end doors, C, are cut slanting at the top C', so that when they are opened and thrown out to the sides the sides B will rest on their slanting tops C', and thus form the shed or shelter for the stock while feeding. The top D D is also composed of two hinged doors, hinged at *b b* and forming a ridge at D'. When the top doors, D D, are opened they will admit hay or whatever feed is desired to be thrown in, whereupon they are closed and form part of the shed.

Inside the sides B are longitudinal bars E, to hold the feed in place when doors B are opened, but leaving a space, E', open at the lower part, large enough to permit the stock to put their heads through to feed.

In the bottom of the box A is the hay-rack proper, consisting of two rows of slanting slats, *f*, fastened between the sides of the box, and a ridge-pole F, running the length of the box and raised higher than the line where the slats *f* are fastened to the sides of the box. This slanting position of the slats makes the feed slide from the middle of the box toward the sides, thus bringing it within reach of the stock standing at the sides. In the space formed between the bottom G of the box and the slanting slats *f* the short particles of the feed fall, as well as the hay-seed, when hay is fed, and can be removed either by having a drawer fitted in the space or by simply drawing it out with a rake or other implement.

By reference to the foregoing description and the accompanying drawings the advantages of my invention are obvious. It provides a portable feed-rack that can be filled through the hinged top doors, D D, at the stack or barn, and hauled to any place in a field, or wherever it is desired to feed the stock. By having the hinged sides B B supported by the end doors, C C, having slanting tops C' C', a shelter is provided for the stock and protects it from the sun or the inclemency of the weather, and, lastly, the slanting slats *f* form a space between the bottom G and the slats for the purpose of saving the short particles of the food and the hay-seed.

Having thus described my invention, I claim and desire to secure by Letters Patent of the United States—

In a feed-rack, the combination of the box A, having longitudinal side slats, E, inclined slat-floor *f*, leaving a space between it and the bottom G of the box, end doors, C, cut off slanting at their top C', hinged sides B, and hinged roof D, said sides and roof being hinged to the upper edge of the box and swinging at right angles to the end doors, C, the whole constructed, combined, and arranged substantially as and for the purpose shown and set forth.

In testimony that I claim the foregoing as my own I have hereunto affixed my signature in presence of two witnesses.

NAPOLEON P. MARSH.

Witnesses:
H. C. FOLEY,
ARTHUR INGLE.